United States Patent
Luo et al.

(10) Patent No.: US 10,684,955 B2
(45) Date of Patent: Jun. 16, 2020

(54) MEMORY DEVICES AND METHODS WHICH MAY FACILITATE TENSOR MEMORY ACCESS WITH MEMORY MAPS BASED ON MEMORY OPERATIONS

(71) Applicant: MICRON TECHNOLOGY, INC., Boise, ID (US)

(72) Inventors: Fa-Long Luo, San Jose, CA (US); Tamara Schmitz, Scotts Valley, CA (US); Jeremy Chritz, Seattle, WA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/493,505

(22) Filed: Apr. 21, 2017

(65) Prior Publication Data

US 2018/0307614 A1 Oct. 25, 2018

(51) Int. Cl.
*G06F 12/10* (2016.01)
*G06F 12/02* (2006.01)

(52) U.S. Cl.
CPC .......... *G06F 12/10* (2013.01); *G06F 12/0223* (2013.01); *G06F 2212/1016* (2013.01); *G06F 2212/1028* (2013.01); *G06F 2212/154* (2013.01)

(58) Field of Classification Search
CPC ........... G06F 12/0207; G06F 2212/454; G06F 12/0813
See application file for complete search history.

(56) References Cited

U.S. PATENT DOCUMENTS

| 5,870,625 | A | 2/1999 | Chan et al. |
| 8,621,181 | B1 * | 12/2013 | Zhu ..................... G06F 12/0292 |
| | | | 711/209 |
| 2004/0024952 | A1 | 2/2004 | Bains et al. |
| 2009/0303807 | A1 | 12/2009 | Lee et al. |
| 2010/0002792 | A1 | 1/2010 | Seyedi-esfahani |

(Continued)

FOREIGN PATENT DOCUMENTS

WO 2014204661 A1 12/2014

OTHER PUBLICATIONS

International Search Report and Written Opinion dated Jul. 10, 2018 for PCT Application No. PCT/US2018/025660, 15 pages.
(Continued)

*Primary Examiner* — Larry T Mackall
*Assistant Examiner* — Michelle T Bechtold
(74) *Attorney, Agent, or Firm* — Dorsey & Whitney LLP

(57) ABSTRACT

Examples described herein include systems and methods which include an apparatus comprising a memory array including a plurality of memory cells and a memory controller coupled to the memory array. The memory controller comprises a memory mapper configured to configure a memory map on the basis of a memory command associated with a memory access operation. The memory map comprises a specific sequence of memory access instructions to access at least one memory cell of the memory array. For example, the specific sequence of memory access instructions for a diagonal memory command comprises a sequence of memory access instructions that each access a memory cell along a diagonal of the memory array.

21 Claims, 7 Drawing Sheets

(56) References Cited

U.S. PATENT DOCUMENTS

| | | | |
|---|---|---|---|
| 2011/0128810 A1* | 6/2011 | Sato | G06F 9/345 |
| | | | 365/230.06 |
| 2011/0153908 A1 | 6/2011 | Schaefer et al. | |
| 2013/0138867 A1 | 5/2013 | Craft et al. | |
| 2014/0181427 A1 | 6/2014 | Jayasena et al. | |
| 2014/0188961 A1 | 7/2014 | Plotnikov et al. | |
| 2015/0032940 A1* | 1/2015 | Karamcheti | G06F 1/3209 |
| | | | 711/103 |
| 2017/0004089 A1* | 1/2017 | Clemons | G06F 12/0893 |
| 2017/0200094 A1 | 7/2017 | Bruestle et al. | |
| 2017/0220352 A1 | 8/2017 | Woo et al. | |
| 2018/0121786 A1 | 5/2018 | Narayanaswami et al. | |

OTHER PUBLICATIONS

U.S. Appl. No. 16/043,921 titled "Memory Devices and Methods Which May Facilitate Tensor Memory" filed Jul. 24, 2018, pp. all.

Cho, et al., MEC: Memory-Efficient Convolution for Deep Neural Network, Proceedings of the 34th International Conference on Machine Learning, vol. 70 Aug. 2017, p. 815-824.

* cited by examiner

MEMORY DEVICES AND METHODS WHICH MAY FACILITATE TENSOR MEMORY ACCESS WITH MEMORY MAPS BASED ON MEMORY OPERATIONS

BACKGROUND

High speed memory access, and reduced power consumption are features that are demanded from semiconductor devices. In recent years, systems that have adopted multi-core processors for the execution of applications have resulted in faster access patterns to a memory device serving as a main memory (e.g., dynamic random access memory (DRAM)) and also more random access patterns. For example, a typical access pattern to the DRAM repeats bank activation, read access or write access, and bank precharge in the order. Access patterns to a memory device for faster access are needed. The efficiency and performance of a computing device may be affected by different memory device. Accordingly, a need exists for fast and efficient access patterns.

Tensors, which are generally geometric objects related to a linear system, may be utilized in machine learning and artificial intelligence applications. Tensor processing may include processing of matrix algebra or other linear systems analysis. Such processing may be intensive and repetitive, in that a common operand may be utilized several times, for example; in layered processing of tensors. Such repetition, combined with speed of processing, may necessitate repeated memory access to perform operations for tensor processing.

DETAILED DESCRIPTION

Figure 1:
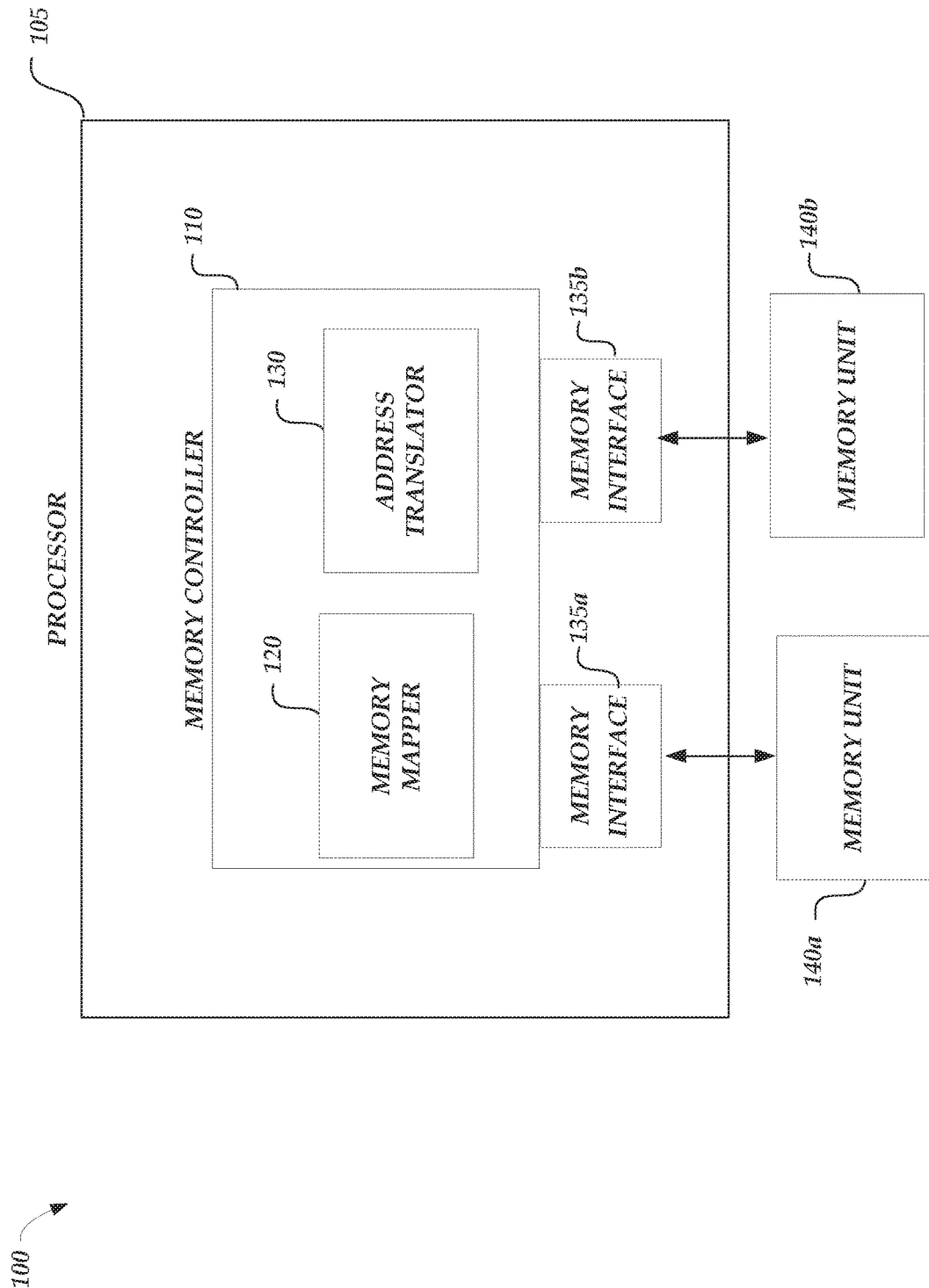
FIG. 1 is a schematic illustration of a computing system arranged in accordance with examples described herein.

Certain details are set forth below to provide a sufficient understanding of embodiments of the present disclosure. However, it will be clear to one skilled in the art that embodiments of the present disclosure may be practiced without various of these particular details. In some instances, well-known wireless communication components, circuits, control signals, timing protocols, computing system components, and software operations have not been shown in detail in order to avoid unnecessarily obscuring the described embodiments of the present disclosure.

Generally described, memory units, such as a memory storage device or flash memory, execute read and write commands received from memory controllers and/or directly from a computing device or network sending a memory command. Memory units may receive read or write commands as a sequence of instructions, with each instruction corresponding to a specific location identified by a memory address. For example, a read memory command may be processed by a memory controller as a request to read a specific address of a specific memory unit. Such a command may be sent to a memory device as an instruction to access that location of the memory device. A memory instruction may include such addressable information (e.g., row/column of memory cell and/or a logical address that points to a row/column of a memory cell), as determined by a memory controller based on the read memory command. For example, the location of the memory device may be at a particular physical memory cell in a logical memory partition of the memory device. In an example of a memory array as a memory unit, a memory controller may perform circuitry operations (e.g., charging row or column lines) to access particular physical memory cell. Such circuitry operations can be time-consuming and power consuming. Similarly, a memory controller determining which logical memory partition of a memory unit may include information requested that can be accessed at a specific memory rate can be a time-consuming and power consuming process for execution of memory commands.

In accessing specific memory cells of a memory unit, read or write commands may not differentiate where, physically, the information requested is stored in the memory unit. Also, a memory controller may not send instructions to the memory units based on any pattern in which information has been stored in a memory unit. Memory units may receive write commands and, thereby, process writing to a memory unit, without regard to the specifics of an operation being performed or implemented in a processor or computing device. For example, a memory unit may receive a write command, and store information associated with that write command to a specific location in memory that has been determined to be available. As described herein, advantageously, operations being performed or implemented in a processor or computing device, may include executing memory commands as defined by that operation being performed. For example, a specific sequence of memory access instructions to access memory cell of a memory array may include a sequence of memory access instructions defined by an operation order of the memory command. For example, memory may be accessed as described herein in a particular pattern which may facilitate tensor operations. Tensor operations may utilize matrix data, and accordingly may seek to read and/or write data in a particular pattern (e.g. diagonal, etc.) In examples of a diagonal calculation for a matrix operation, a sequence of memory access instructions may access various memory cells along a diagonal of a memory array, in accordance with a diagonal memory command implemented by a memory controller coupled to that memory unit including such a memory array.

FIG. 1 is a schematic illustration of a computing system 100 arranged in accordance with examples described herein. The computing system 100 includes a processor 105 coupled to memory units 140a, 140b. The processor may implement a memory controller 110 that includes a memory mapper 120 and an address translator 130. The memory controller 110 may be coupled to the memory units 140a, 140b via memory interfaces 135a, 135b. The processor 105 may implement memory commands received from various data sources or processes being executed on the processor 105. For example, the processor 105 may receive memory access requests (e.g., read or write commands) from a process being executed on the processor 105. In such a case, the memory controller 110 may process the memory access requests, as implemented by the processor 105, to access one or more of the memory units 140a, 140b.

The processor 105 may be used to implement a memory system of the computing system 100 utilizing the memory controller 110. The processor 105 may be a multi-core processor in some examples that includes a plurality of cores. The plurality of cores may for example be implemented using processing circuits which read and execute program instructions independently. The memory controller 110 may handle communication with the memory system that may be outside of the processor 105. For example, the memory controller 110 may provide access commands to the memory units 140a, 140b from the plurality of cores of the processor 105. The memory controller 110 may provide such access commands via memory interfaces 135a, 135b. For example, the memory interfaces 135a, 135b may provide a clock signal, a command signal, and/or an address signal to any of the memory units 140a, 140b. While writing data by storing the data in the memory units 140a, 140b, the memory controller 110 provides instructions to write data to the memory units 140a, 140b based on a write command. While reading the stored data from the memory units 140a, 140b, the memory controller 110 provides instructions based on a read command and receives the data from the memory units 140a, 140b.

The memory controller 110 may be implemented using circuitry which controls the flow of data to the memory units 140a, 140b. The memory controller 110 may be a separate chip or integrated circuit coupled to the processor 105 or being implemented on the processor 105, for example, as a core of the processor 105 to control the memory system of the computing system 100. In some embodiments, the memory controller 110 may be integrated into the processor 105 to be referred to as integrated memory controller (IMC).

The memory controller 110 may communicate with a plurality of memory units to implement a memory system with the processor 105. For example, the memory units 140a, 140b, may communicate simultaneously with the memory controller 110. While the example of FIG. 1 depicts two memory units 140a, 140b, it can be expected that the memory controller 110 may interact with any number of memory units. For example, eight memory units may be included and each memory unit may include a data bus having an eight-bit width, thus the memory system implemented by the processor 105 may have a sixty-four bit width. The memory units 140a, 140b may be dynamic random-access memory (DRAM) or nonvolatile random-access memory (RAM), such as ferroelectric RAM (Fe-RAM), spin-transfer-torque RAM (STT-RAM), phase-change RAM (PCRAM), resistance change RAM (ReRAM), or the like. In various embodiments, such memory units may be referred to as memory chips, memory modules, memory dies, memory cards, memory devices, memory arrays, and/or memory cells. Physically, the memory units 140a, 140b may be arranged and disposed as one layer, or may be disposed as stacked layers. In some embodiment, the memory units 140a, 140b may be disposed as multiple layers, on top of each other, to form vertical memory, such as 3D NAND Flash memory.

In some examples where the memory units 140a, 140b may be implemented using DRAM or non-volatile RAM integrated into a single semiconductor chip, the memory units 140a, 140b may be mounted on a memory module substrate, a mother board or the like. For example, the memory units 140a, 140b be referred to as memory chips. The memory units 140a, 140b may include a memory cell array region and a peripheral circuit region. The memory cell array region includes a memory cell array with a plurality of banks, each bank including a plurality of word lines, a plurality of bit lines, and a plurality of memory cells arranged at intersections of the plurality of word lines and the plurality of bit lines. The selection of the bit line may be performed by a plurality of column decoders and the selection of the word line may be performed by a plurality of row decoders.

The peripheral circuit region of the memory units 140a, 140b may include clock terminals, address terminals, command terminals, and data input/output (I/O) terminals (DQ). For example, the data I/O terminals may handle eight-bit data communication. Data input output (I/O) buffers may be coupled to the data input/output terminals (DQ) for data accesses, such as read accesses and write accesses of memories. The address terminals may receive address signals and bank address signals. The bank address signals may be used for selecting a bank among the plurality of banks. A row address and a column address may be provided as address signals. The command terminals may include a chip select (/CS) pin, a row address strobe (/RAS) pin, a column address strobe (/CAS) pin, a write enable (/WE) pin, and/or the like. A command decoder may decode command signals received at the command terminals from the memory controller 110 via one of the memory interfaces 135a, 135, to receive various commands including a read command and/or a write command. Such a command decoder may provide control signals responsive to the received commands to control the memory cell array region. The clock terminals may be supplied with an external clock signal, for example from one of the memory interfaces 135a, 135.

The memory mapper 120 of the memory controller 110 may provide a memory map to the memory units for access of the memory units. For example, the memory map may be selected based on a memory command provided to access the memory unit 140a and/or the memory unit 140b. For example, a read or write operation of a process or program being implemented on the processor 105 may be a memory access operation that sends a read or write command to the memory controller 110. The memory mapper 120 may retrieve or configure a memory map based on a memory command associated with that memory access operation. The memory map may include one or more a specific sequences of memory access instructions to access memory units (e.g. memory unit 140a and/or memory unit 140b). For example, the specific sequence of memory access instructions may access one or more memory cells of a memory array in a particular pattern which may be advantageous for performing a tensor and/or matrix operation. Each memory access instruction may include an instruction for a respective address of a memory cell of the plurality of memory cells. For example, the memory map may be provided to the memory unit 140a via an address terminal of the memory interface 135a to an address terminal of the memory unit 140a.

The memory mapper may generate, provide, and/or select the memory map to be specific to a type of memory command. Memory commands may include row memory commands or column memory commands, such as to access a respective row or column of a memory array. Memory commands may also include commands based on an operation being performed or implemented on the processor 105. Tensor operations may include various matrix operations and/or computations. For example, a tensor operation may include the calculation of a diagonal of a specific matrix or a determinant of a specific matrix; for example, the latter being part of a matrix inverse computation.

The memory mapper 120 may provide a memory map such that memory is accessed as defined by an order of operation of a tensor memory command. Tensor memory commands may include a diagonal memory command, a determinant memory command, or any matrix memory command. For example, a specific sequence of memory access instructions to access memory cell of a memory array may include a sequence of memory access instructions defined by an operation order of a tensor memory command. In some examples of a diagonal calculation for a matrix operation, a sequence of memory access instructions may access various memory cells along a diagonal of a memory array, in accordance with a diagonal memory command being implemented by the processor 105, as part of a tensor operation being performed on the processor 105. Accordingly, in providing a memory map for a memory command, the memory mapper 120 may identify a plurality of memory addresses of one or more memory units 140a, 140b to access that corresponding memory address; and, thereby, allocate the plurality of memory addresses into the memory map according to an operation order of the memory command, such that the specific sequence of instructions execute in that operation order.

The memory mapper 120 may provide a memory map that may be based on a tensor memory command for a memory unit having a three-dimensional memory array. The memory map may specify that each layer of the three-dimensional memory array is stored according to a respective layer of tensor processing. Tensor operations may be carried out on three-dimensional structures; and, as described herein, the memory map may be used to efficiently access memory based on that three-dimensional structure of the tensor operation. Tensor operations on a three-dimensional matrix may include operations based on modes, such as a vertical column mode, a row mode, a tube mode, a vertical slice mode, a lateral slice mode, and/or a frontal sliced mode. Each mode may correspond to a two-dimensional vector or plane of a respective axis of the three-dimensional operation; and, accordingly, a memory may be accessed, such as reading or writing, memory in like manner. Advantageously, in some examples, accessing memory in three dimensions may allow more efficient processing of tensors; for example, in machine learning applications.

Advantageously, in some examples, for tensor memory commands, system and methods described herein may be utilized as a memory access scheme in processing of tensors or performing tensor operations, such as tensor decomposition. Tensor-based processing may compute several layers of data to be processed, with each subsequent layer being based on a combination of the previous layer's results. In some applications, layers may be stored in memory so that subsequent processing of layers may be performed more efficiently. For example, a layer may be written diagonally in a two-dimensional memory array or three-dimensional memory device. The memory mapper 120 may provide a memory map arranged to access such a memory unit in a diagonal fashion, as specified by the order of operations in that tensor memory command. In some examples, the tensor memory command may include processing each previous layer's results by initially writing each layer's result in the memory unit as a diagonal. Accordingly, the memory unit may also be accessed to process that diagonal computation in the way where each layer's results was written according to the tensor memory command. In this manner, any memory unit or device may be accessed in accordance with tensor memory access, which may be, as described herein, access to memory defined by an operation order of tensor processing.

While the memory mapper 120 has been described in the context of an implementation of the processor 105 as part of the memory controller, it can be expected that the memory mapper 120 may also be implemented differently in other embodiments. For example, the memory mapper 120 may be coupled to the processor 105 as a separate circuit such as an application specific integrated circuits (ASIC), a digital signal processor (DSP) implemented as part of a field-programmable gate array (FPGA), or a system-on-chip (SoC). As another example, the memory mapper 120 may be coupled to the memory controller 110, being implemented by the processor 105, as a series of switches that determine the sequence of instructions that are to be performed on a memory unit 140a, 140b. The switches may be multiplexors, for example, with selected lines coupled to the memory controller 110.

The address translator 130 of the memory controller 110 may translate a memory map for a memory unit based on a memory command to access the memory unit 140a and/or the memory unit 140b. A memory map may be translated when an operation order of a memory command is different than an operation order of a previous memory command that was provided to perform a previous memory access operation at memory unit 140a and/or the memory unit 140b. For example, the memory mapper 120 may have previously provided a memory map based on a diagonal command, and, subsequently, the memory mapper 120 received a command from the memory controller to provide a memory map for a determinant memory command. In such examples, the address translator 130 may identify the addresses of the memory cells in the memory map utilized for the diagonal memory command. Once identified, the address translator 130 may allocate the identified addresses into a memory map configured for the determinant memory command, such that determinant memory command accesses the identified addresses in an operation order defined by a determinant operation, rather than a diagonal memory operation in which order the memory cells had been previously accessed. Once allocated, the address translator 130 completes translation of the memory map for the determinant memory command, and the memory mapper 120 may provide the translated memory map to the memory unit 140a and/or the memory unit 140b.

While the address translator 130 has been described in the context of an implementation of the processor 105 as part of the memory controller, it can be expected that the address translator 130 may also be implemented differently in other embodiments. For example, the address translator 130 may be coupled to the processor 105 as a separate circuit such as the ASIC, a digital signal processor (DSP) implemented as part of a field-programmable gate array (FPGA), or a system-on-chip (SoC). As another example, the address translator 130 may be coupled to the memory controller 110, being implemented by the processor 105, as a series of switches that identify respective addresses of a memory unit 140a, 140b to translate those identified addresses for a different memory map. The switches may be multiplexors, for example, with selected lines coupled to the memory controller 110.

Figure 2A:
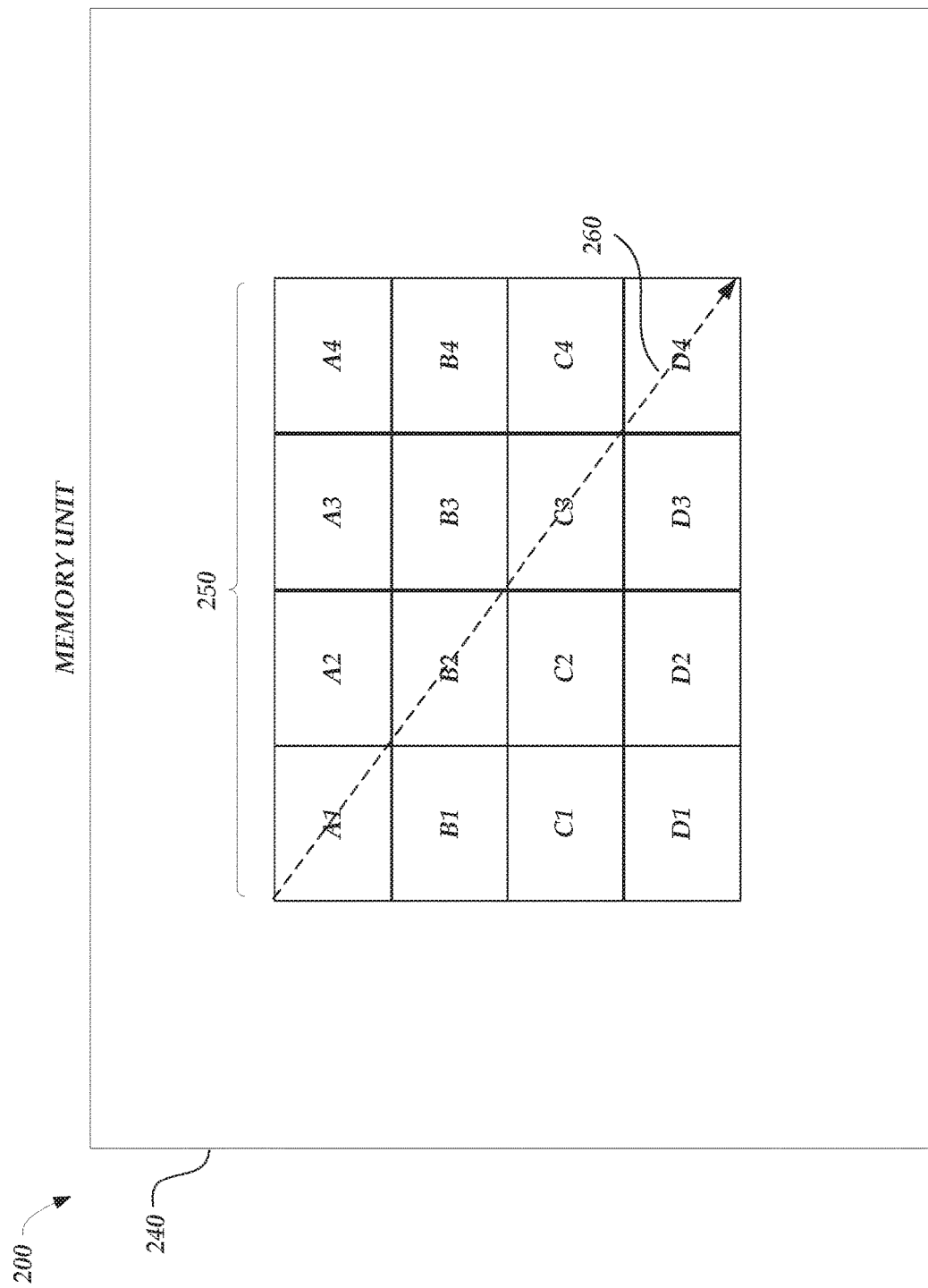
FIGS. 2A-2C are schematic illustrations of a memory unit being accessed in accordance with exampled described herein.
Figure 2B:
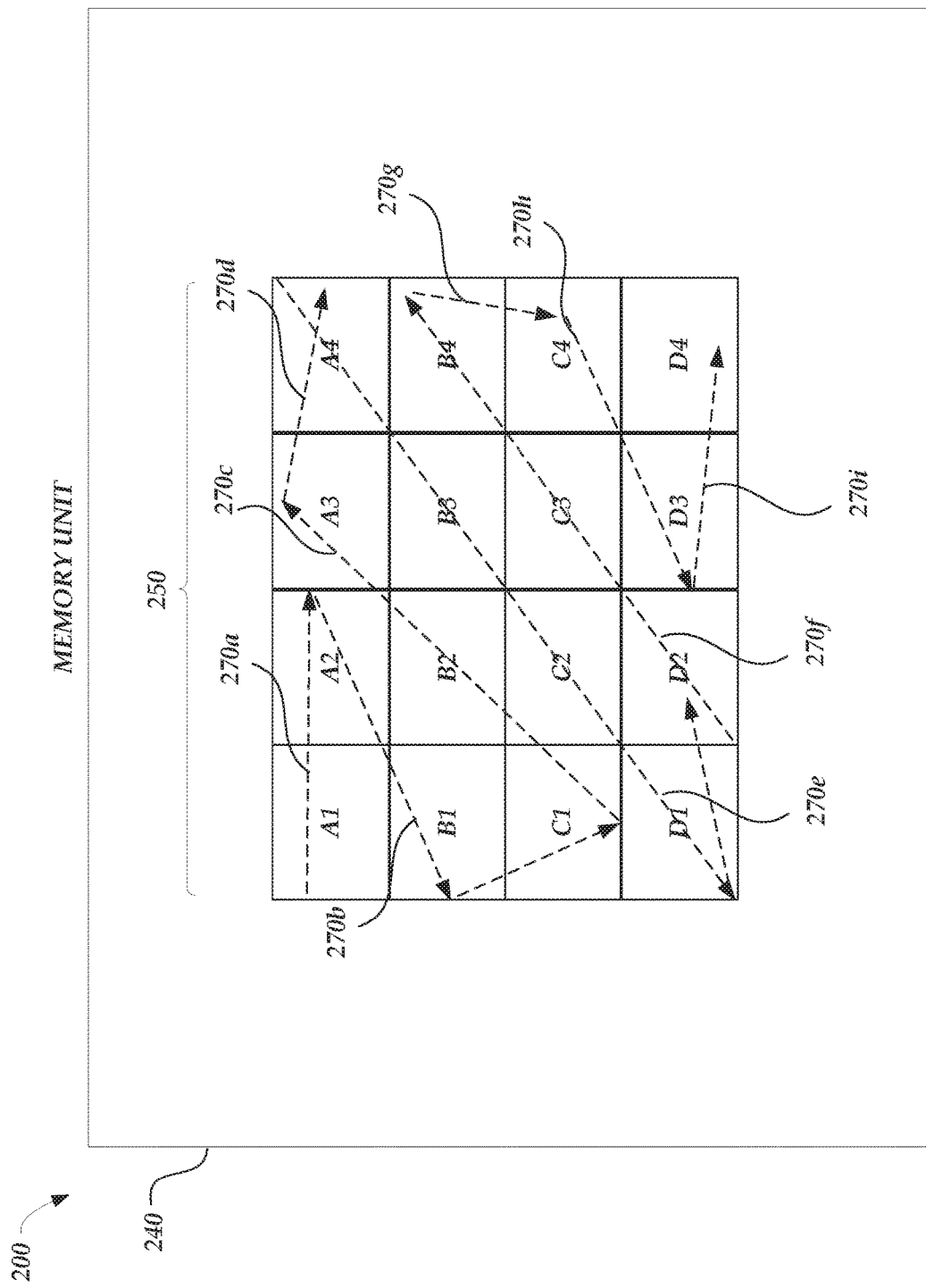
Figure 2C:
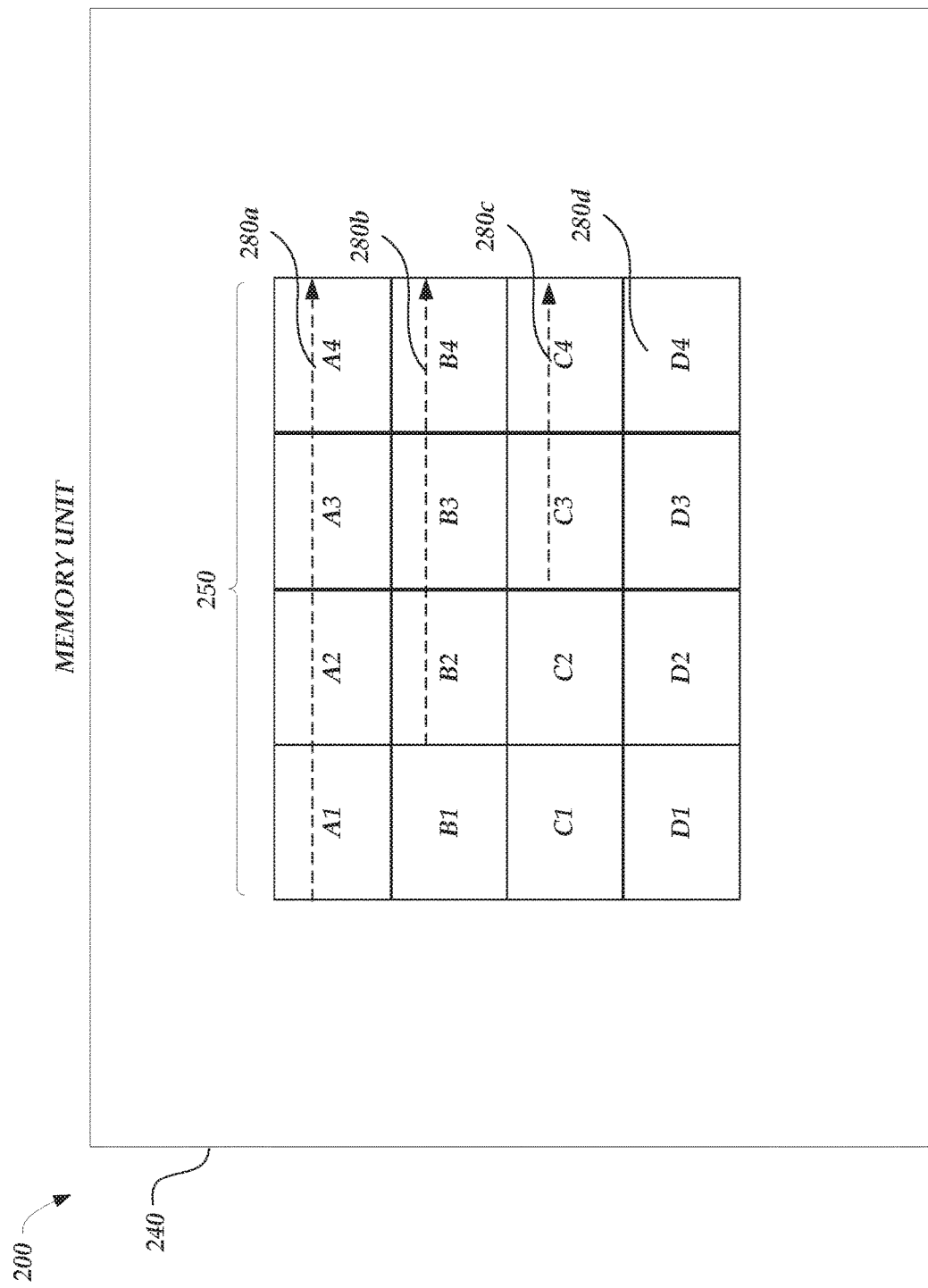

FIGS. 2A-2C are schematic illustrations of a memory unit being accessed in accordance with examples described herein. FIG. 2A is a schematic illustration of a memory unit 240 being accessed in accordance with a diagonal memory command as part of a tensor operation executing a diagonal matrix operation. The memory cells 250, which include memory cells labeled as A1-A4, B1-B4, C1-C4, and D1-D4, are schematically illustrated in the memory unit 240 of a memory system 200. In the example of FIG. 2A, the memory unit 240 may be a memory array including the memory cells 250. In the example of FIG. 2A, the memory system 200 receives a diagonal memory command for implementation of a tensor operation executing a diagonal matrix operation. A memory controller, such as the memory controller 110 of FIG. 1, may implement a memory mapper 120 to provide a memory map for the diagonal matrix operation. The memory map includes a sequence of instructions to access the memory cells 250 defined by an operation order of the diagonal matrix operation. The operation order 260 of the diagonal matrix operation is depicted with a dotted line in FIG. 2A, accessing the memory cells 250 according to the operation order of the diagonal matrix operation. As depicted, the operation order 260 initially starts with accessing of the memory cell A1, proceeding through accessing of the memory cells B2 and C3, to end with accessing of the memory cell D4. Accordingly, the memory cells 250 of the memory unit 240 may be accessed according to an operation order of the diagonal matrix operation based on the memory map provided to the memory unit for that diagonal memory command.

FIG. 2B is a schematic illustration of a memory unit 240 being accessed in accordance with a tensor memory command as part of a tensor operation executing a matrix operation. The memory cells 250, which include memory cells labeled as A1-A4, B1-B4, C1-C4, and D1-D4, are schematically illustrated in the memory unit 240 of a memory system 200. In the example, the memory unit 240 may be a memory array including the memory cells 250. In the example of FIG. 2B, the memory system 200 receives a tensor memory command for implementation of a tensor operation executing a matrix operation. A memory controller, such as the memory controller 110 of FIG. 1, may implement a memory mapper 120 to provide a memory map for the tensor operation. The memory map may include a sequence of instructions to access the memory cells 250 defined by an operation order of the matrix operation. The operation order 270a-270i of the matrix operation is depicted with a dotted line in FIG. 2B, accessing the memory cells 250 according to the operation order of the matrix operation. As depicted, the operation order 270a initially starts with accessing of the memory cells A1 and A2 sequentially. The operation order further includes the operation order 270b, with accessing of the memory cell B1, after A2, sequentially. The operation order further includes the operation order 270c, with accessing of the memory cells C1, B2, and A3 sequentially. The operation order further includes the operation order 270d, with accessing of the memory cell A4, after A3, sequentially. The operation order further includes the operation order 270e, with accessing of the memory cells B3, C2, and D1, all after A4, sequentially. The operation order further includes the operation order 270e, with accessing of the memory cell D2. The operation order further includes the operation order 270f, with accessing of the memory cells C3 and B4, both after D2, sequentially. The operation order further includes the operation order 270g, with accessing of the memory cell C4. The operation order further includes the operation order 270h, with accessing of the memory cell D3, after C4. The operation order ends with the operation order 270i, with accessing of the memory cell D4. Accordingly, the memory cells 250 of the memory unit 240 may be accessed (e.g. by a memory controller and/or other structures described herein) according to an operation order of the matrix operation based on the memory map provided to the memory unit for that tensor memory command.

FIG. 2C is a schematic illustration of a memory unit 240 being accessed in accordance with a tensor memory command as part of a tensor operation executing a matrix operation. In the example of FIG. 2C, the memory system 200 receives a tensor memory command for implementation of a tensor operation executing a matrix operation. A memory controller, such as the memory controller 110 of FIG. 1, may implement a memory mapper 120 to configure a memory map for the tensor operation. The memory map includes a sequence of instructions to access the memory cells 250 defined by an operation order of the matrix operation. The operation order 280a-280d of the matrix operation is depicted with a dotted line in FIG. 2C, accessing the memory cells 250 according to the operation order of the matrix operation. As depicted, the operation order 280a initially starts with accessing of the memory cells A1 through A4 sequentially. The operation order further includes the operation order 280b, with accessing of the memory cells B2 through B4 sequentially. The operation order further includes the operation order 280c, with accessing of the memory cells C3 and C4 sequentially. The operation order ends with the operation order 280d, with accessing of the memory cell D4. Accordingly, the memory cells 250 of the memory unit 240 may be accessed according to an operation order of the matrix operation based on the memory map provided to the memory unit for that tensor memory command.

While described in FIGS. 2A-2C in the context of a two-dimensional memory array, it can be expected that memory access commands may be configured for memory in a three-dimensional or N-dimensional space; for example, to process tensor operations with corresponding memory commands defined by a tensor operation in that three-dimensional or N-dimensional space.

Figure 3:
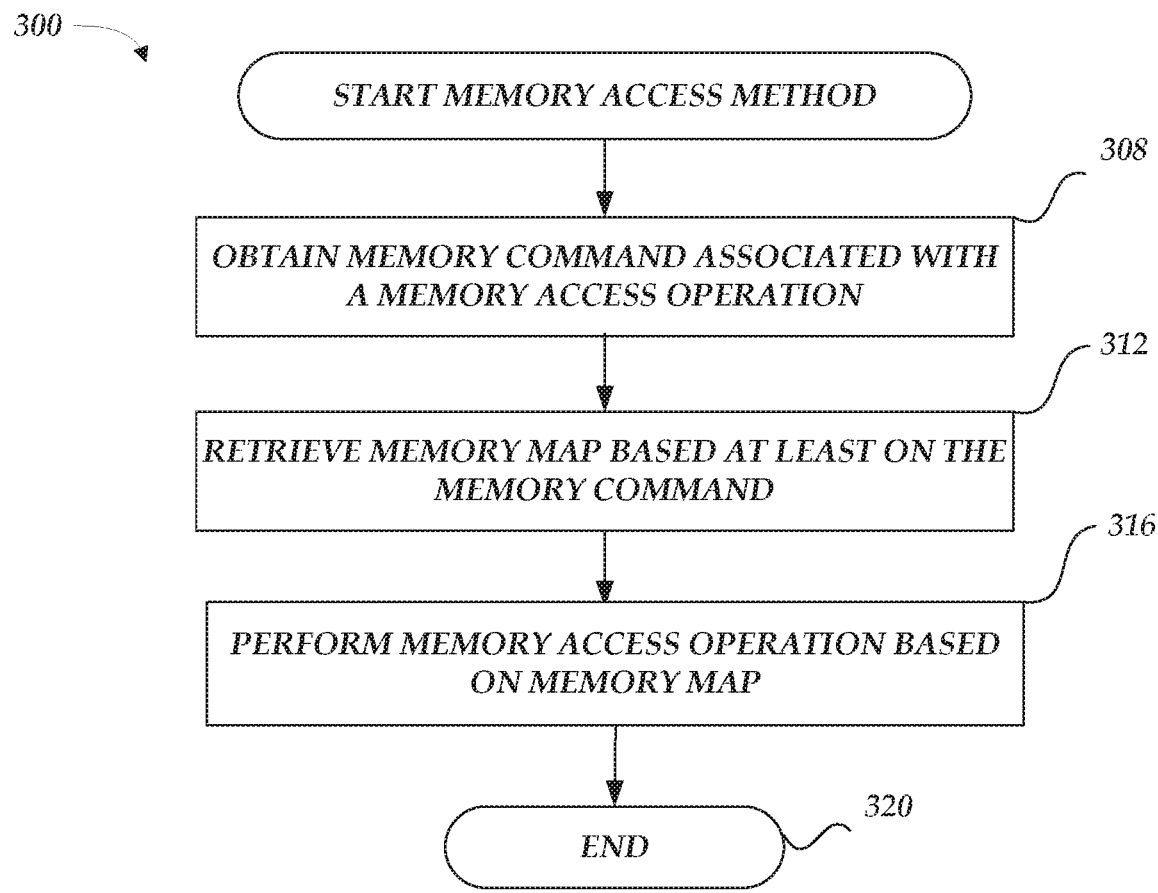
FIG. 3 is a flowchart of a method arranged in accordance with examples described herein.

FIG. 3 is a flowchart of a method arranged in accordance with examples described herein. Example method 300 may begin a memory access method. The method 300 may include a block 308 that recites "obtain memory command associated with a memory access operation." An operation or process being performed by a processor, such as processor 105, may obtain or receive a memory command from that operation or process to read or to write to a memory unit. For example, a read or write operation of a process or program being implemented on the processor 105 may be a memory access operation that sends a read or write command to the memory controller 110. Accordingly, the memory controller 110 may obtain a write command to write data to the memory units 140a, 140b. The memory controller 110 may also obtain a read command to read data stored at the memory units 140a, 140b. Block 308 may be followed by block 312 that recites "retrieve memory map based at least on the memory command." A memory mapper of a memory controller, such as the memory mapper 120, may retrieve a memory map from a stored memory based on the access command. In some embodiments, the memory mapper may retrieve a memory map by providing a memory map specific to that memory command. In the examples described herein, a memory mapper may provide the memory map such that memory is accessed as defined by an order of operation of a tensor memory command.

Block 312 may be followed by block 316 that recites "perform memory access operation based on the memory map." A memory unit may receive the retrieved memory map, and thereby perform memory access operations according to the memory map. For example, a memory unit may receive a memory map which includes a sequence of instructions to access memory cells defined by an operation order of the diagonal matrix operation based on a diagonal memory command received by a memory controller. Accordingly, each memory cell of the memory unit may be accessed according to that operation order. Advantageously, operations being performed or implemented in a processor or computing device, may be improved by accessing memory in accordance with the memory commands defined by that operation being performed, for example, with respect to the speed of processing such an operation. The block 316 may be followed by block 320 that ends the method 300.

Figure 4:
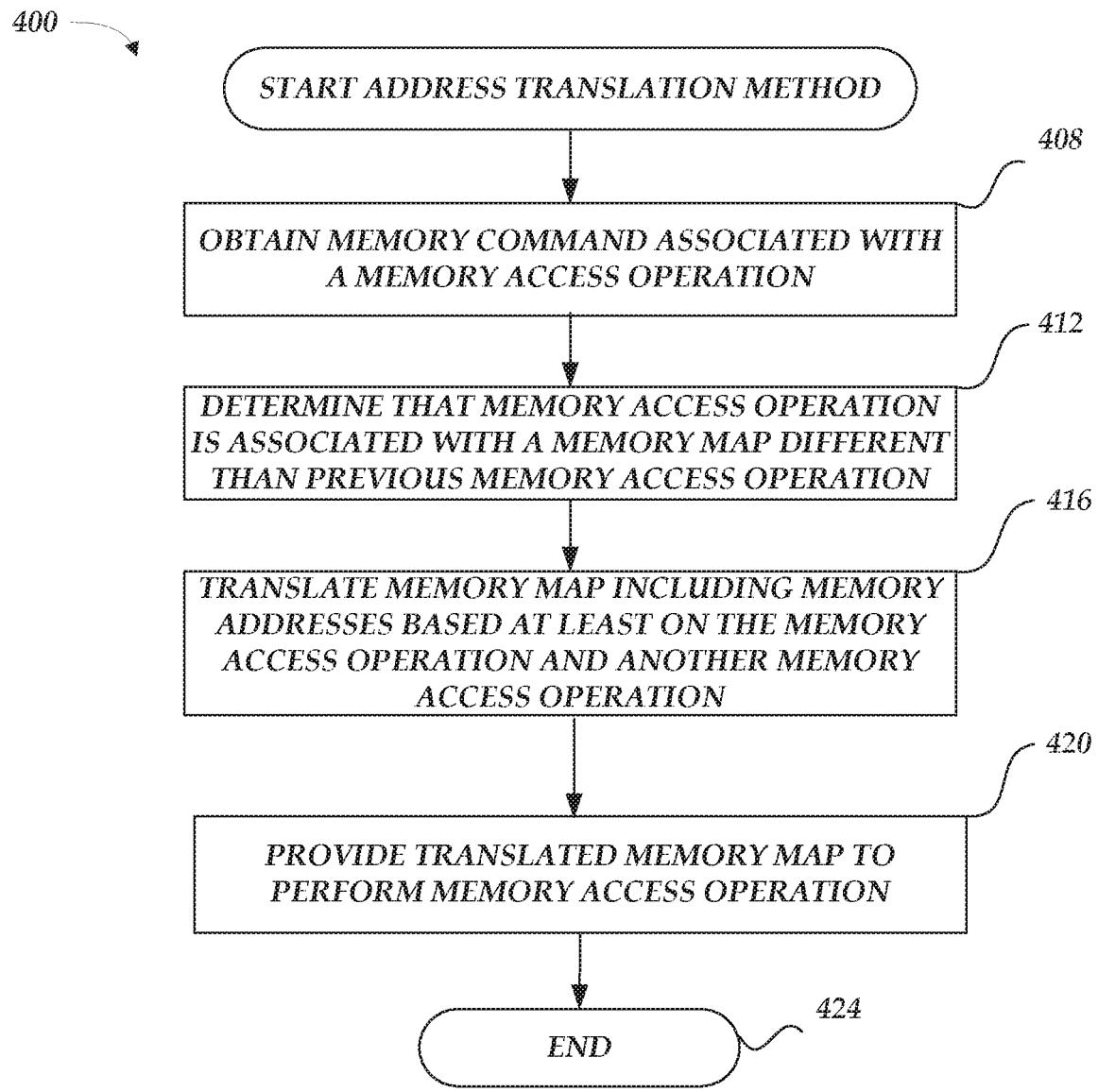
FIG. 4 is a flowchart of a method arranged in accordance with examples described herein.

FIG. 4 is a flowchart of a method arranged in accordance with examples described herein. Example method 400 may begin the address translation method. The method 400 may include a block 408 that recites "obtain memory command associated with a memory access operation." An operation or process being performed by a processor, such as processor 105, may obtain or receive a memory command from that operation or process to read or to write to a memory unit. For example, a read or write operation of a process or program being implemented on the processor 105 may be a memory access operation that sends a read or write command to the memory controller 110. Accordingly, the memory controller 110 may obtain a write command to write data to the memory units 140a, 140b. The memory controller 110 may also obtain a read command to read data stored at the memory units 140a, 140b. Block 408 may be followed by block 412 that recites "determine that memory access operation is associated with a memory map different than previous memory access operation." A memory controller may compare a previously provided memory command, with a subsequently received command, to determine that the memory commands are based on different order of operation. For example, a comparison of a header in each memory command may identify each memory command as being different than the other. In such a case, the memory controller may determine that previously provided memory command is associated with a memory map that is different than the memory map to be configured for the subsequently received memory command.

Block 412 may be followed by block 416 that recites "translate memory map including memory addresses based at least on the memory access operation and another memory access operation." To translate the memory map, an address translator of the memory controller may identify the addresses of the memory cells in the memory map utilized for previously provided memory command. Once identified, the address translator may provide the identified addresses in a memory map for the subsequently received memory command, such that subsequently received memory command accesses the identified addresses in an operation order defined by an operation of the subsequently received. Once allocated, the address translator has translated the memory map for the subsequently received command. Block 416 may be followed by block 420 that recites "provide translated memory map to perform memory access operation." A memory mapper may provide the translated memory map to a memory unit, and thereby perform memory access operations on the basis of the translated memory map. Accordingly, each memory cell of the memory unit may be accessed according to an operation order of the subsequently received memory command, rather than the previously provided memory command. Block 420 may be followed by block 424 that ends the method 400.

The blocks included in the described example methods 300 and 400 are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 5:
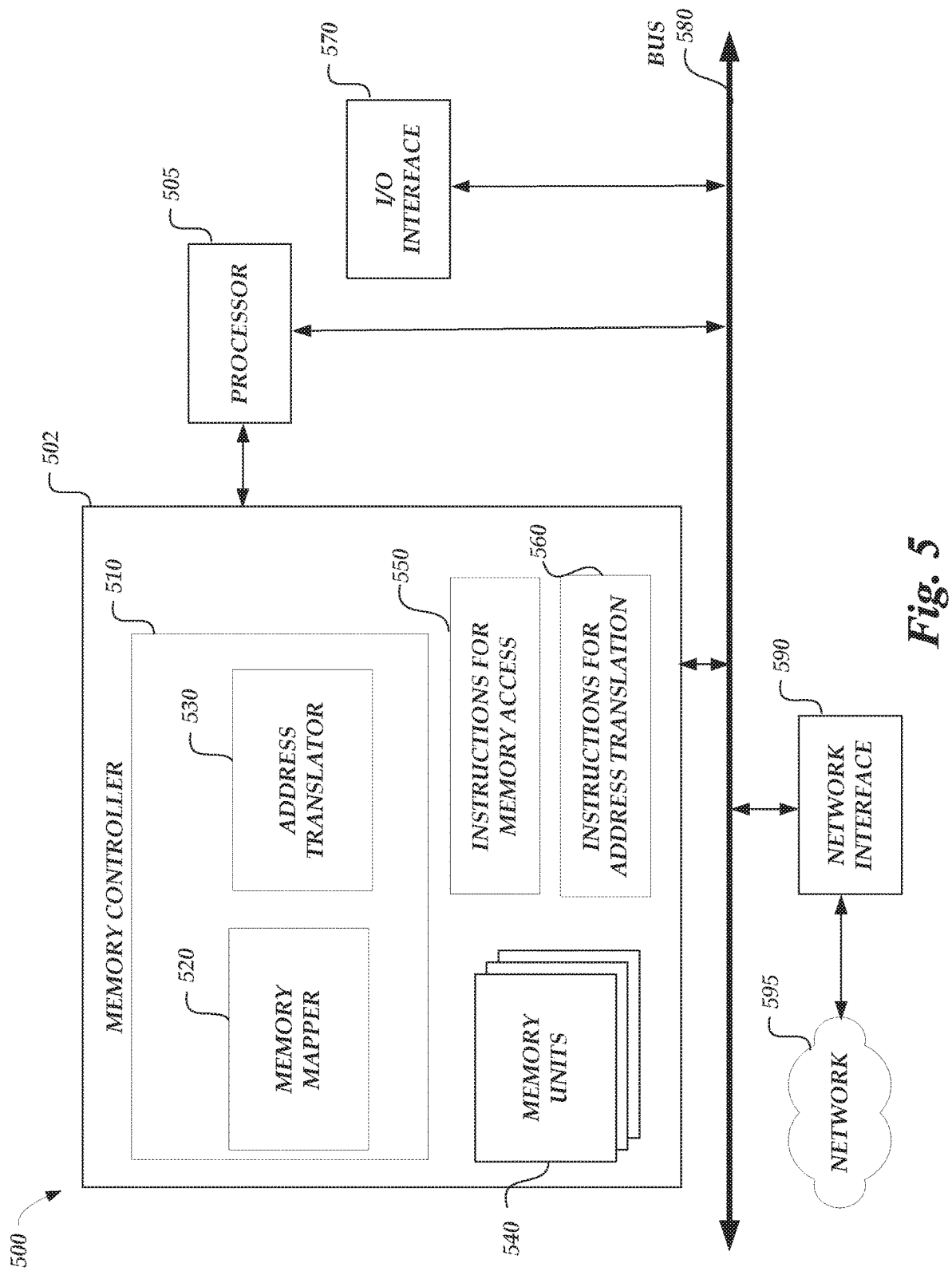
FIG. 5 is a schematic illustration of a computing system arranged in accordance with examples described herein.

FIG. 5 is a schematic illustration of a computing system arranged in accordance with examples described herein. The computing device 500 may operate in accordance with any embodiment described herein. The computing device may be a smartphone, a wearable electronic device, a server, a computer, an appliance, a vehicle, or any type of electronic device. The computing system 500 includes a memory system 502, a processor 505, and I/O interface 570, and a network interface 590 coupled to a network 595. The memory system 502 includes a memory controller 510 having a memory mapper 520 and address translator 530, with both operating according to the functionality described herein with respect to a memory mapper and an address translator. Similarly numbered elements of FIG. 5 include analogous functionality to those numbered elements of FIG. 1. For example, the memory units 540 may operate and be configured like the memory units 140a, 140b of FIG. 1. Processor 505 may include any type of microprocessor, central processing unit (CPU), an application specific integrated circuits (ASIC), a digital signal processor (DSP) implemented as part of a field-programmable gate array (FPGA), a system-on-chip (SoC), or other hardware to provide processing for system 500.

The memory system 502 also includes memory units 540 and non-transitory hardware readable medium 550, 560 including instructions, respectively, for memory access and address translation. The processor 505 may control the memory system 502 with control instructions that indicate when to execute the instructions for memory access 550 and/or the instructions for address translation 560. Upon receiving such control instructions, the memory mapper 520 may execute the instructions for memory access 550; and/or the address translator 530 may execute the instructions for address translation 560. The instructions for memory access 550 may include a program that executes the method 300. The instructions for address translation 560 may include a program that executes the method 400. Communications between the processor 505, the I/O interface 570, and the network interface 590 are provided via a processor internal bus 580. The processor 505 may receive control instructions from the I/O interface 570 or the network interface 590, such as instructions to control execution of memory access or address translation.

Bus 580 may include one or more physical buses, communication lines/interfaces, and/or point-to-point connections, such as Peripheral Component Interconnect (PCI) bus. The I/O interface 570 can include various user interfaces including video and/or audio interfaces for the user, such as a tablet display with a microphone. Network interface 590 communications with other computing devices, such as computing device 500 or a cloud-computing server, over the network 595. For example, the network interface 590 may be a USB interface.

From the foregoing it will be expected that, although specific embodiments of the present disclosure have been described herein for purposes of illustration, various modifications may be made without deviating from the spirit and scope of the present disclosure.

What is claimed is:

1. An apparatus comprising:
   a memory array comprising a plurality of memory cells; and
   a memory controller coupled to the memory array, the memory controller comprising:

a memory mapper configured to configure a first memory map based on a first memory command having a first matrix operation order and associated with a first memory access operation, wherein the first memory map comprises a specific sequence of memory access instructions to access at least one memory cell of the memory array; and an address translator configured to translate the first memory map to a second memory map based on a second matrix operation order of a second memory command associated with a second memory access operation, the second matrix operation order being different than the first matrix operation order, and further configured to identify, in the first memory map, a plurality of memory addresses of the first memory map arranged in accordance with the first matrix operation order and allocate the identified plurality of memory addresses into the second memory map in accordance with the second matrix operation order of the second memory command.

2. The apparatus of claim 1, wherein the memory access instructions are specific to a type of memory command.

3. The apparatus of claim 1, wherein the first memory command comprises a diagonal memory command and the second memory command comprises a determinant memory command, wherein the first matrix operation order corresponds to a diagonal operation order, and wherein the second matrix operation order corresponds to a determinant operation order.

4. The apparatus of claim 1, wherein each memory access instruction of the specific sequence of memory access instructions comprises an instruction for a respective address of a memory cell of the plurality of memory cells.

5. The apparatus of claim 1, wherein the memory controller is implemented in a processor.

6. The apparatus of claim 1, wherein the memory controller is configured to receive the memory command via a bus coupled to a network interface configured to communicate with a cloud computing network.

7. The apparatus of claim 1, further comprising:
a memory interface coupled to the memory controller and configured to communicate with the memory array.

8. The apparatus of claim 7, wherein the memory mapper is configured to provide the first memory map to the memory array via the memory interface.

9. The apparatus of claim 7, wherein the memory interface comprises a plurality of terminals, wherein at least one port of the plurality of terminals is configured to receive at least one of a memory command signal, an address signal, a clock signal, or a data signal.

10. The apparatus of claim 1, wherein the second memory access operation is provided the second memory map.

11. The apparatus of claim 1, further comprising:
another memory array comprising another plurality of memory cells, wherein the memory controller is coupled to the other memory array, wherein the specific sequence of memory access instructions comprises instructions to access at least one memory cell of the memory array and at least one memory cell of the other memory array.

12. The apparatus of claim 1, wherein the memory command comprises a diagonal memory command, and wherein the specific sequence of memory access instructions to access at least one memory cell of the memory array comprises a sequence of memory access instructions that each access a memory cell along a diagonal of the memory array.

13. The apparatus of claim 1, wherein the specific sequence of memory access instructions to access at least one memory cell of the memory array comprises a sequence of memory access instructions defined by the first matrix operation order of the memory command.

14. The apparatus of claim 1, wherein the first matrix operation order of the first memory command corresponds to a matrix operation order defined by a diagonal memory command, and wherein the second matrix operation order of the second memory command corresponds to a matrix operation order defined by a determinant operation.

15. A method comprising:
obtaining a first memory command associated with a first memory access operation having a diagonal operation order;
retrieving a first memory map for the first memory access operation based at least on the first memory command;
performing the first memory access operation based on the first memory map;
obtaining a second memory command associated with a second memory access operation;
translating the first memory map to a second memory map for the second memory access operation in accordance with the second memory access operation having a determinant operation order;
identifying, in the first memory map, a plurality of memory addresses of the first memory map arranged in accordance with the diagonal operation order; and
allocating the identified plurality of memory addresses into the second memory map in accordance with the determinant operation order of the second memory command.

16. The method of claim 15, wherein the first memory map comprises a specific sequence of memory access instructions to access a plurality of memory cells.

17. The method of claim 16, wherein performing the first memory access operation based on the first memory map comprises accessing respective addresses of the plurality of memory cells based on the first memory map.

18. The method of claim 15, wherein the first memory map is based on the diagonal operation order of the first memory access operation.

19. A method comprising:
obtaining a first memory command associated with a first memory access operation;
obtaining a second memory command associated with a second memory access operation;
determining that the second memory access operation is for use in a second matrix operation order different than a first matrix operation order for use in the first memory access operation;
translating a first memory map of the first memory command to a second memory map of the second memory command based on the determination regarding the second matrix operation order being different than the first matrix operation order, wherein translating the first memory map of the first memory command to the second memory map of the second memory command comprises:
identifying, in the first memory map, a plurality of memory addresses of the first memory map arranged in accordance with the first matrix operation order; and
allocating the identified plurality of memory addresses into the second memory map in accordance with the second matrix operation order of the second memory command; and providing the second memory map to perform the second memory access operation.

20. The method of claim 19, wherein the first memory map is based on the first matrix operation order of the first memory command that was provided to perform the first memory access operation.

21. The method of claim 19, further comprising:
accessing a plurality of memory cells based on the second memory map.

* * * * *